March 14, 1933.    B. D. NEWTON    1,901,404
OUT-OF-ORDER SIGNAL
Filed Nov. 19, 1924    3 Sheets-Sheet 2

INVENTOR:
BURKETT D. NEWTON
BY
ATTORNEY.

March 14, 1933.  B. D. NEWTON  1,901,404
OUT-OF-ORDER SIGNAL
Filed Nov. 19, 1924  3 Sheets-Sheet 3

Fig. 6.

INVENTOR:
BURKETT D. NEWTON
BY
Fad W Lewis
ATTORNEY.

Patented Mar. 14, 1933

1,901,404

UNITED STATES PATENT OFFICE

BURKETT D. NEWTON, OF LOS ANGELES, CALIFORNIA, ASSIGNOR TO MAGNETIC SIGNAL CO., A CORPORATION OF CALIFORNIA

OUT-OF-ORDER SIGNAL

Application filed November 19, 1924. Serial No. 750,746.

This invention relates to signalling apparatus, and it relates particularly to an out-of-order indicating means, adaptable for use in conjunction with electrically operated signalling apparatus.

My invention is of a construction and design which is particularly adaptable for use in conjunction with what is known as wigwag signals, these signals being employed extensively at points where roadways or boulevards cross railroad tracks. My invention is, however, a distinct and separate arrangement and even though I describe it hereinafter in use with a wigwag signal, it should be understood that I wish in no way to limit myself to this particular adaptation.

Wigwag signals now in common use generally comprise a housing from which a pendulum extends, this pendulum having a target situated at the lower end thereof and being arranged for oscillation when a train approaches the railroad crossing at which the signal is stationed. The signal in most cases is provided with a gong which is sounded upon the approach of a train and has a red light situated on the target which is illuminated at this time. Owing to the importance of signals of this character in providing safety to vehicle drivers, these signals must be of the highest reliability possible, it being readily seen that the failure of a signal to indicate the approaching of a train may cause a catastrophe.

In spite of the efforts of manufacturers and designers of wigwag signals, failure in operation does occur. The causes of inoperableness of these wigwag signals may be divided into two classes,—"electrical failures" and "mechanical failures". An "electrical failure" may be interpreted as the inoperableness of the signal due to a deficit in supply of electrical current thereto. This shortage in current may be due to many obvious reasons, such as line leakage or deterioration of the storage battery which supplies the current. "Mechanical failures" create inoperableness in the signal due to mechanical defects, which prevents the operation thereof even though sufficient electricity is supplied thereto.

It is an object of this invention to provide a means for displaying a plainly visible signal when the signalling device is inoperative through any of the before mentioned causes.

It is an object of this invention to provide a means for indicating the inoperableness of an electrically operated signalling device, this indicating means becoming effective upon either an electrical or mechanical failure of the signal.

It is also an object of my invention to provide an out-of-order indicator having a sign or banner which will, upon the inoperableness of the signal upon which it is employed, swing into a position adjacent to the target of the signal, this sign having an inscription thereon visually expressing the inoperableness of the signal. To accomplish this, I provide a device which may comprise a banner or sign which is swingable from non-indicating into indicating position. Means are provided for retaining the banner in non-indicating position, this means being actuated in a manner to permit the banner to swing into indicating position upon the inoperableness of the signal due to either an electrical or a mechanical failure thereof.

It is a still further object of the invention to provide in an out-of-order indicator of this character an indicating sign or banner which may be readily reset. To accomplish this, I provide a retaining mechanism for retaining the banner in non-indicating position, which automatically returns to latching position after an operation thereof. The banner may be provided with a latch construction which is arranged to be retained by retaining mechanism when the banner is swung into a concealing housing.

It is a further object of the invention to provide an out-of-order indicator of this character which is adapted for ready installation on a standard wigwag signal, this indicator being of such construction that it will not detract from the operative efficiency or reliability of a wigwag.

Another object of my invention is to provide a signalling device in which a main signal and an out-of-order signal are used.

The out-of-order signal is retained in non-indicating position by magnetic means energized by the source of energy which energizes the main signal. Whenever the source of energy is insufficient to be capable of operating the main signal the out-of-order signal will be released so that it may move into indicating position.

A still further object of the invention is to provide a combination of the character mentioned in the preceding paragraph in which the means for retaining the out-of-order signal in non-indicating position consists of a holding electromagnet which is energized by the source of energy which is adapted to energize the main signal, and in which means is associated with the holding electromagnet and the out-of-order signal, this means operating upon a deenergization of the holding electromagnet to release the out-of-order signal.

It is a still further object of the invention to provide a releasing means which is adapted to intermittently oppose the holding means of the invention during the operation of the main signal; but is adapted to constantly oppose the holding means if the main signal fails to operate when it is being supplied with energy, the releasing means causing the holding means to release the out-of-order signal whenever the releasing means constantly opposes the holding means.

Another object of the invention is to provide a combination of the character mentioned in the preceding paragraph in which the releasing means is provided in the form of an electromagnet which is wound to oppose the influence of the holding electromagnet. When the releasing electromagnet is constantly energized, such as when the main signal fails to operate even though energized, the holding electromagnet is opposed to the extent that the out-of-order signal will be released.

A further object of the invention is to provide an out-of-order signal per se.

A still further object of the invention is to provide an out-of-order signal which is retained in non-indicating position by a latch means, which latch means is held in latching position by a magnetic means.

A still further object of the invention is to provide a combination of the character mentioned in the preceding paragraph, which also includes means for preventing energization of the magnetic means unless the out-of-order signal is in a position to be engaged by the latch mechanism.

Various other objects are present in the details of construction of the out-of-order signal and due to their numerousness they will not be specifically mentioned here, but will appear in the following description.

Other objects and advantages of the invention will be made evident hereinafter.

Referring to the drawings which are for illustrative purposes only.

Figures 1, 5:
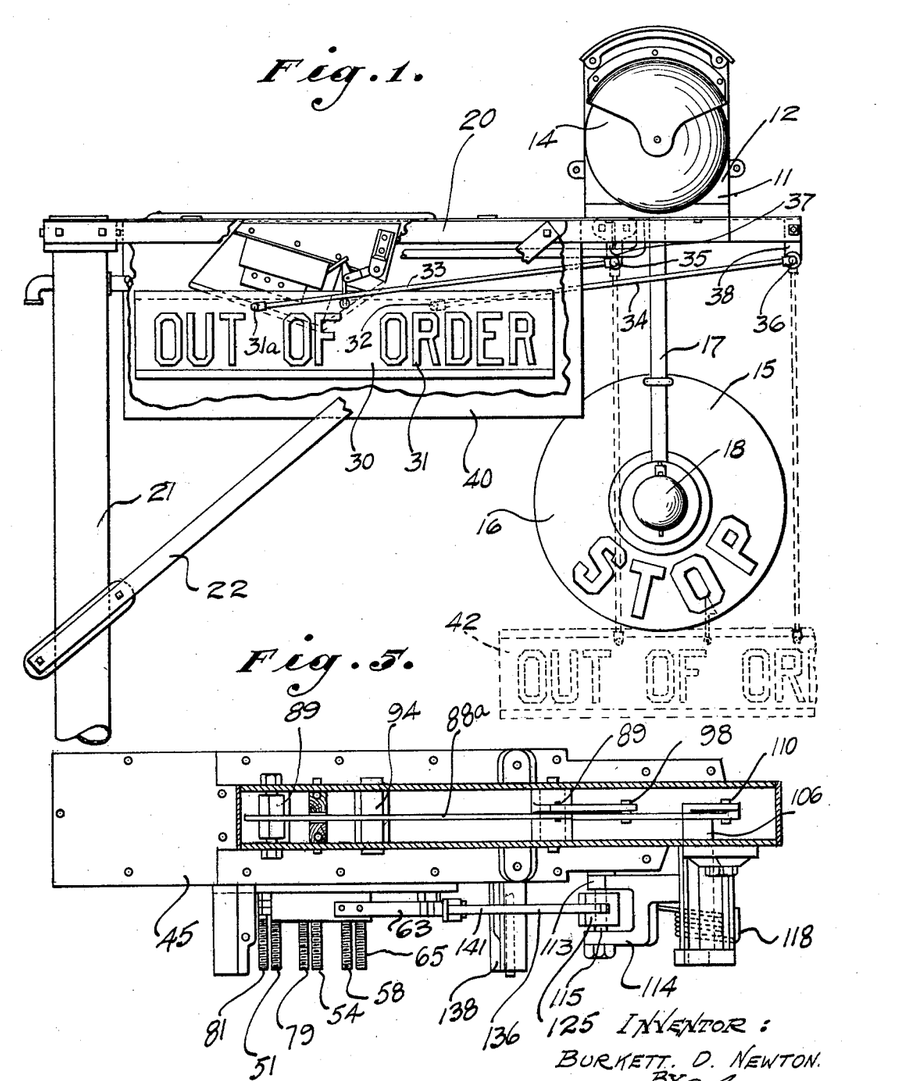
Fig. 1 is a view illustrating an indicating device employing the features of my invention, in use with a wigwag signal.
Fig. 5 is a section taken as indicated by the line 5—5 of Fig. 3.

Referring particularly to Fig. 1, the wigwag signal with which my invention may be very advantageously employed is shown at 11. The signal may comprise a housing 12 which houses certain of the mechanism thereof. Mounted on the housing 12 is a gong 14 and extending downwardly from the housing 12 is a pendulum 15, having a target 16 secured at the lower end of the shaft 17 thereof. The target 16 has a red light 18 mounted near the center thereof, and may have the inscription Stop printed thereon. The signal 11 is arranged to be supported by an arm 20 which extends from a pole 21 and has a brace 22 for its support. Upon the approach of a train near the crossing at which a signal of this character is placed, electricity is supplied to the signal which causes a lighting of the light 18, a swinging of the pendulum 15 and a sounding of the gong 14, this being entirely sufficient to warn vehicle drivers travelling on the road intersecting the crossing that a train is approaching.

The out-of-order indicating device presented by my invention, and which is especially applicable to a wigwag of this character, comprises a sign or banner 30 having an inscription 31 thereon, which is preferably out-of-order, as shown. Pivotally attached at 31ª and 32 are parallel rods 33 and 34, respectively. The upper ends of the rods 33 and 34 are in turn pivoted at 35 and 36 to the brackets 37 and 38, respectively, these brackets being in turn secured to the arm 20. When the wigwag is in operable condition, the sign 30 is arranged to be retained within a housing 40 which is secured to the arm 20, as shown. When the wigwag is in inoperative condition, the sign 30 is arranged to assume the position indicated by the dotted lines 42 of Fig. 1. The construction of the banner and of the parallel supporting rods 33 and 34 is such as to allow the banner 30 to swing into a position adjacent and directly below the target 16. The position of the sign 30, when the signal 11 is out of order, is such that it will be readily observed by vehicle drivers, warning them of the inoperableness of the signal at this particular crossing.

Referring particularly to Figs. 2 to 6, inclusive, retaining and control mechanism of the invention comprises a shell 45 which is secured within the housing 40. Holding coils 46 and 47 are located within the shell 45 below the partition 48. Current is supplied to the coils 46 and 47 through a wire 50 which extends thereto from a terminal post 51 mounted on the terminal board 52. Current passes from the holding coils through a wire 53 which extends to a terminal post 54, which is likewise situated on the terminal board 52. For controlling the supply of current to the holding coils 46 and 47, I provide a control means in the form of a switch 55, as is clearly shown in Figs. 2 and 6. This switch comprises a central movable contact finger 56 which has a wire 57 extending thereto from a terminal 58. The movable contact finger 56 is arranged for engagement with a stationary spring finger 59, having a wire 60 extending therefrom to the post 51. It is arranged that current supplied to the post 58 from the exterior will pass through the wire 57 to the movable finger 56 to the contact 59 and to the post 51 through the wire 60. The switch 55 also includes a second stationary contact finger 63, this finger 63 having a wire 64 which extends to a contact post 65. From the contact post 65 there extends a wire 66 which has extra side lights 67 included therein. Extending from the lights 67 is a wire 68 which is attached to the terminal 54. When the movable finger 56 engages the finger 59, current will be supplied to the holding coils 46 and 47. When the finger 56 is permitted to contact with the finger 63, electricity will be supplied through the wire 64 to the post 65 through the wire 66, lighting the lights 67 and flowing through the wire 68 to the terminal 54. Extending through the coils 46 and 47 are cores 70 and 71. Situated on the cores 70 and 71 adjacent to the holding coils 46 and 47 is releasing means in the form of releasing or "mechanical failure" coils 73 and 74. The mechanical failure coils 73 and 74 are wound in a direction opposite to the winding of the holding coils 46 and 47, and having sheathings 75, as shown clearly in Fig. 4. The purpose of the mechanical failure coils 73 and 74 is to set up a neutralizing flux for counteracting the lines of force of the holding coils 46 and 47 when these mechanical failure coils 73 and 74 are energized, the actuation of these mechanical failure coils being explained subsequently. Current is supplied to the releasing coils 73 and 74 through a wire 78 which extends thereto from a terminal 79 situated on a terminal board 52, and current is carried from the release coils through a wire 80 which extends to a terminal 81. The coils 46, 47, 73 and 74 are arranged to be secured within the shell 45 and below the partition 48 by means of a bracket 83 which is secured to the partition 48, the cores 70 and 71 extending through the bracket 83 and having securing nuts 84 extending thereonto.

An armature 85 is pivoted on a pin 86 which extends through the side walls of the shell 45, the lower end 87 of this armature 85 extending adjacent to the heads 88 of the cores 70 and 71. When the holding coils 46 and 47 are energized, the lines of force created thereby retain the armature 85 in the position shown by the full lines in Fig. 3. An arm 88$^a$ is situated in the shell 45 above the partition 48, as shown, this arm 88$^a$ having a notch 89 which is arranged for engagement with the lug 90 formed on the upper portion of the armature 85. The arm 88$^a$ pivots at 89$^a$ to the web 91 of a bell crank 92. The bell crank 92 pivots on a shaft 95 which is supported by the sides of the shell 45. A connecting link 97 pivots the web 91 of the bell crank 92 at 98. On the left hand end 99 of the connecting link 97 there in provided a bent-over lug 100, this lug being arranged to engage with the lower face 101 of the web 91 in a manner to limit the swinging of the bell crank 92 in a direction indicated by the arrow 103 of Fig. 3. A retaining latch member 105 is provided which has a shaft 106 which extends from the interior of the shell 45 to the exterior thereof, and is rotatably supported at the outer end thereof by a bracket 107 which is secured by bolts 108 to the side wall of the shell 45. An arm 109 extends from the interior end of the shaft 106 and has pivotal connection with the link 97, as shown at 110. On the exterior part of the shaft 106 a latch arm 111 is provided, this arm 111 being bifurcated so as to provide projections 113 and 114. The latch pin 115 extends between and is attached to the projections 113 and 114. A spring having a coil portion 118 surrounding the shaft 106 is provided, the end 119 of the spring engaging the bifurcated arm 111, and the end 120 engaged, as shown, with the bracket 107. The purpose of the spring is for resiliently retaining the latch member 105 in what may be considered its latching position, in which position it is shown by the full lines of the various figures of the drawings. It will be understood that by retaining the latch member 105 in latching position, it is necessary to also maintain the associated parts in a position in accordance thereto. The strength of the spring, however, is not sufficient to retain the latch member 105 in latching position when the sign 30 is supported thereby, without the assistance of the armature 85.

Figure 2:
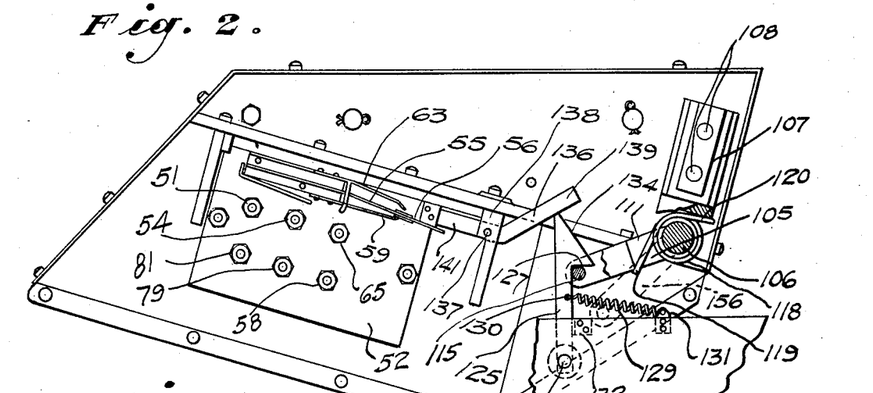
Fig. 2 is a side view of the retaining mechanism provided by my invention.
Figures 3, 4:
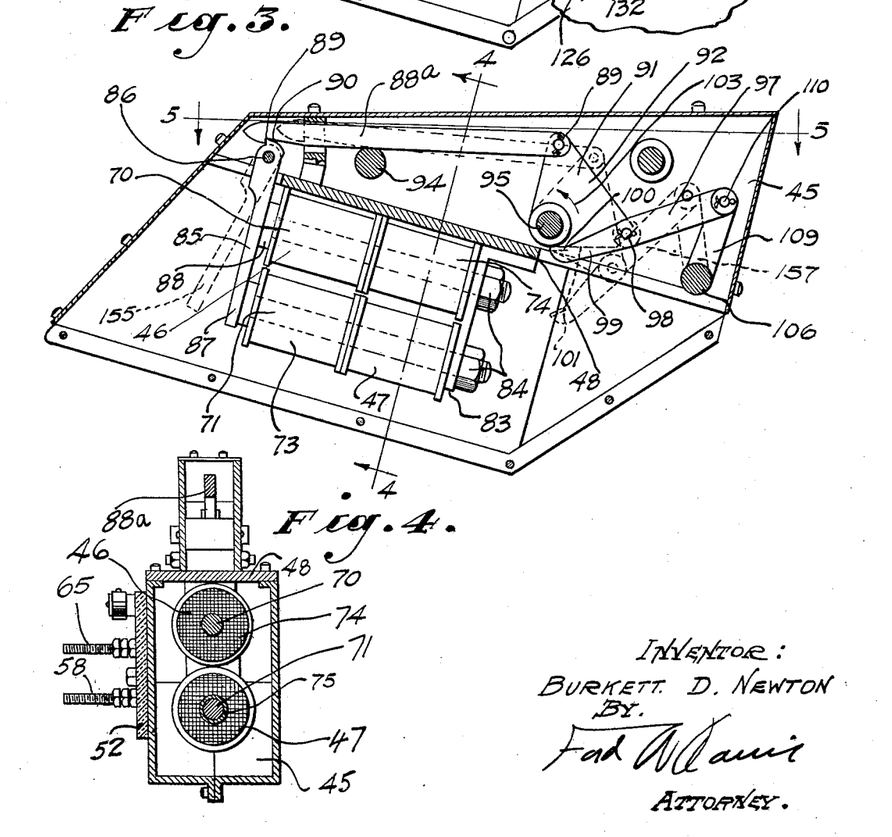
Fig. 3 is a vertical sectional view through the retaining mechanism shown in Fig. 2, this view clearly illustrating certain portions of the latching mechanism.
Fig. 4 is a section taken as indicated by the line 4—4 of Fig. 3.

A pawl 125 is provided which pivots, as shown in Figs. 1 and 2 at 126, to the banner or sign 30. The upper portion of the pawl 125 is provided with a hooked shoulder 127 which, when the sign is in non-indicating position, engages with the pin 115 in a manner to retain said sign 30 in non-indicating position. A spring 129, which attaches to the pawl at 130 and to the sign by means of a bracket 131, is provided for the purpose of retaining the pawl 125 in a position against a stop 132. The reason for providing pivotal mounting of the pawl 125 is as follows:

When the sign 30 is allowed to swing into indicating position, the latch member 111, after the releasing thereof under action of the spring 118, will immediately return to raised position. When the sign 30 is swung into the housing 40 and is to be retained in non-indicating position after the signal has been again rendered operable, the diagonal face 134 rides against the pin 115, forcing the pawl 125 leftwardly against the action of the spring 129 until it passes the shoulder 127, at which time the spring 129 will move the pawl 125 rightwardly against the stop 132 into normal or latching position. A switch operating lever 136 is pivoted at 137 to a bracket 138, this bracket 138 being in turn secured to the shell 45. When the sign 30 is in non-indicating position, the right or bent end 139 of the switch operating lever 136 is arranged to be engaged by the upper end of the pawl 125 in a manner to swing and retain the switch operating lever in the position shown in Fig. 2. The left end 141 of the lever then engages the movable contact finger 56 of the switch 55 in a manner to retain this finger 56 in engagement with the finger 59. This engagement between the fingers 56 and 59 supplies current to the holding coils 46 and 47, providing lines of force which retain the armature 85 against the heads 88 of the cores 70 and 71. From this, it will be seen that the armature 85 is attracted by the holding coils 46 and 47 only when the sign 30 is in non-indicating position, and when the pawl 125 engages the switch operating lever 136 in a manner to cause contact between the fingers 56 and 59.

Figure 6:
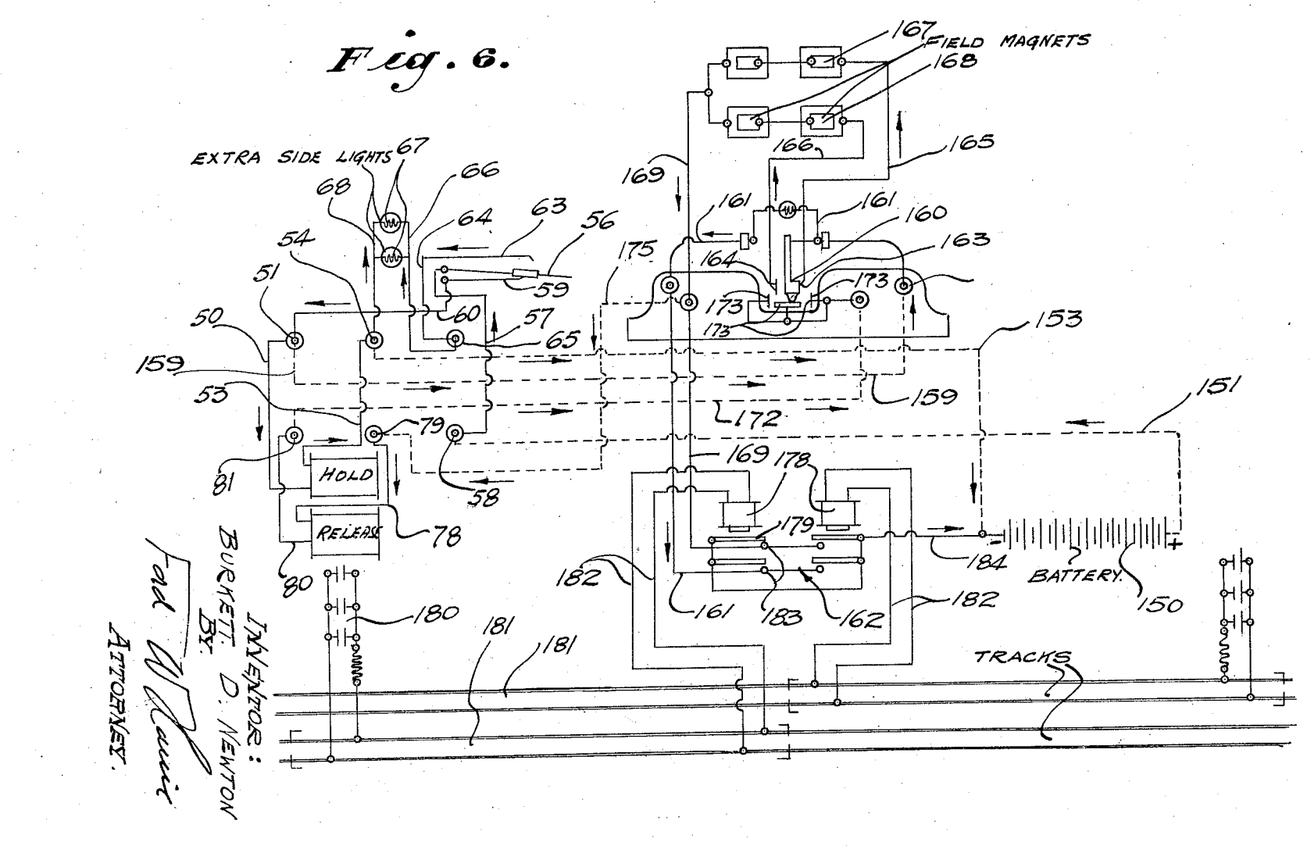
Fig. 6 is an electrical diagram, clearly illustrating the electrical circuits and the manner of connecting the indicator to a standard wigwag signal.

In Fig. 6, I diagrammatically illustrate the manner in which my invention is included in the electrical system for a wigwag signal of this character. The wiring in Fig. 6, indicated by dotted lines, is indicative of the external wires necessary in the installation. In other words, the wires indicated by full lines are either a distinct part of the wigwag or a part of the out-of-order indicating device. As shown in this figure, from a battery 150 I extend a wire 151 through which electricity is supplied to the terminal post 58 of the indicating device. Current then will flow from the terminal 58 through the wire 57 to the movable finger 56. If the finger 56 is in engagement with the contact 59, as shown, current will be supplied through the wire 60 to the terminal 51. From the terminal 51 current travels through the conductor 50 to the holding coils of the device, and from thence through the wire 53 to the terminal post 54. From the terminal post 54 I extend a wire 153 which carries the current back to the battery 150. In this figure (Fig. 6) I have indicated the direction of the flow of current by arrows. It will be seen that current is directly supplied to the holding coils of the device, being controlled by the switch 55. When a deficit in electrical energy occurs, the attraction of the holding coils 46 and 47 will be reduced, allowing the armature to swing into the position of the dotted lines 155 of Fig. 3. This causes a disengagement between the notch 89 of the arm 88ª and the lug 90 of the armature 85. The weight of the sign 30 on the retaining arm 105 through the pawl 125 causes the latch member 105 to swing downwardly into the position indicated by the dotted lines 156 of Fig. 2. This releases the engagement between the pawl 125 and the pin 115, allowing the sign to swing into out-of-order indicating position. After the engagement between the pawl 125 and the pin 115 is released, the spring 118 will automatically and immediately return the member 105 and its associated parts to the position shown by the full lines in the drawings.

From the post 51 there extends a wire 159, through which current is supplied to a movable contact 160. Connected to the wire 159 is a wire 161 which includes the red light 18 of the target 16. The wire 161 is extended, as shown, to a relay 162. Provided adjacent to the movable contact 160 are contacts 163 and 164, connected through wires 165 and 166 with field coils 167 and 168 respectively. When the contact finger 160 is in engagement with the contact 163, current is supplied through the wire 165 to the field coils 167; and when the contact 160 is in engagement with the contact 164, current is supplied to the field coils 168 through the wire 166, the current being carried from the field coils 167 and 168 through a wire 169 to a relay switch 162. The alternate energizing of the field coils 167 and 168 serves to attract an armature, not shown, which is associated with the pendulum 15 in a manner to swing same. From the terminal 81 there extends a wire 172, which is provided with contacts 173 which are so positioned as to be engaged by the movable finger 160 throughout the various positions thereof, during the oscillation of the pendulum 15. It will be seen then that during the oscillation of the pendulum 15, the contact 160 temporarily engages with one of the contacts 173. This allows a current to pass from the wire 169, through the wire 175 to the terminal 79, through the releasing coils, through the wire 80 to the terminal 81, through the wire 172, one of the contacts 173, the movable contact 160, and from thence through the wiring to the battery, thereby completing the circuit and energizing the mechanical failure or releasing coils 73 and 74.

By the provision of the sheathing 75, the temporary lines of force set up thereby which are in opposition to the lines of force of the holding coils are absorbed by this sheathing 75, and will not affect the influence of the holding coils on the armature 85. However, when a mechanical failure occurs in the wigwag 11; that is, when it becomes inoperable, due to some mechanical defect, the wigwag will stop in one position and the movable contact 160 will be in engagement with one of the contacts 173 for a period of time sufficient to cause neutralizing lines of force to be set up in the releasing coils 73 and 74, exceeding the absorbing capacity of the sheathing 75. When this occurs, the neutralizing lines of force will entirely neutralize the lines of force provided by the holding coils, and provide a releasing of the armature 85, resulting in a swinging of the sign 30 into indicating position, as indicated by the dotted lines 42 of Fig. 1.

When the pawl 125 moves from the position shown in Fig. 2, the switch operating lever is disengaged and the movable finger 56 by virtue of its springing tendency moves into engagement with the finger 63. This supplies current through the finger 63, the wires 64 and 66, illuminating the lamps 67. This serves as an extra warning but is only effective when a mechanical failure occurs and when a current is existing.

A means for establishing a flow of current to the wigwag 11 is provided in the form of a relay switch 162 having coils 178 which attract movable contacts 179. Current is supplied to the coils 178 by sources in the form of batteries 180, the current travelling through either of the tracks 181 and the wires 182 to the coils 178. When a train travels on a portion of the track included in the circuit, the coils 178 will be short-circuited from the batteries, thus allowing the movable contacts 179 to fall, engaging contacts 183 and completing the circuit to the wigwag signal through a wire 184 which connects to the battery 150.

From the foregoing description it will be readily perceived that the automatic indicating device of my invention is readily adaptable to standard signalling equipment without an alteration therein, it being only necessary to make slight alterations in the external wiring thereof. By the use of my indicating device, the efficiency of a wigwag signal is increased to its maximum. Owing to the fact that the operableness of the wigwag cannot be 100 per cent efficient in operation, an indicating device which will indicate when the wigwag is inoperable tends to assist in gaining a maximum efficiency in a signal.

The particular pivoting construction of the sign 30 allows this sign to fall into a position directly below the target 15, this position of the sign being such as to make the notice of it imperative. The specific construction of my out-of-order indicating device is such that pronounced effectiveness is attained. The feature of automatically returning the latch member to latching position, as previously described, makes the resetting of the indicator very simple.

I claim as my invention:

1. In combination: a wig-wag signal including an operating circuit and a source of electrical energy; an out-of-order indicator; an electro-magnet energized by said source; means associated with said electro-magnet to sustain said indicator in a non-indicating position when said electro-magnet is energized; an opposing electro-magnet connected with said circuit, said last named electro-magnet exerting a magnet influence ineffective when fluctuating but effective when constant to neutralize the influence of the first named electro-magnet and to render same ineffective for sustaining the indicator in non-indicating position and means for fluctuating the current passing through said opposing electro-magnet when said wig-wag signal is in operation.

2. In combination: a wig-wag signal including an operating circuit, a circuit changer and a source of electrical energy; an out-of-order indicator; an electro-magnet energized by said source; means associated with said electro-magnet to sustain said indicator in a non-indicating position when said electro-magnet is energized; an opposing electro-magnet connected in series in said circuit, said last named electro-magnet exerting a magnetic influence ineffective when intermittent but effective when constant to neutralize the influence of the first named electro-magnet and to render same ineffective for sustaining the indicator in non-indicating position, the second named electro-magnet being intermittently energized when said circuit changer is in operation and constantly energized when the operating circuit is complete and the circuit changer is immobile.

3. In combination: a wig-wag signal including a movable part, an operating circuit and a source of electrical energy; an out-of-order indicator movably associated with said wig-wag signal and adapted to disposition in a non-indicating position and an out-of-order indicating position; means for sustaining said indicator in a non-indicating position during capability of said signal to operate, said means including an electro-magnet energized by said electrical source; and means adapted to actuate said sustaining means to effect release of said indicator when said signal is rendered inoperative due to failure of said movable part to move, said last named means including an electro-magnet connected with the operating circuit through conductors, and a switch operated by the movement of said movable part.

4. In combination: a wig-wag signal including an operating circuit and a source of electrical energy; an out-of-order indicator; an electro-magnet energized by said source; means associated with said electro-magnet for effectuating movement of said indicator to an indicating position when said electro-magnet is sufficiently de-energized; a second electro-magnet to actuate said means for effectuating movement of said indicator to indicating position; conductors for feeding electric current to said electro-magnet; and means for fluctuating the flow of current through said conductors when said signal is in operation.

5. In combination: a main signal; an operating circuit therefor; a source of energy for said operating circuit; means for closing said operating circuit; an out-of-order signal; mechanism for retaining said out-of-order signal in non-indicating position when said source of energy is operative and for effectuating movement of said out-of-order signal into indicating position when said source of energy is inoperative; release means connected to said main signal; and conductors connecting said release means with said main signal and said operating circuit for energizing said release means, said release means being intermittently energized when said main signal is operating, and being constantly energized when said main signal fails to operate even though energized by said source of energy, said release means causing said mechanism to release said out-of-order signal when constantly energized.

6. In combination: a main signal; an operating circuit therefor; a source of energy for said operating circuit; means for closing said operating circuit; an out-of-order signal; a holding electromagnet energized by said source of energy; means associated with said holding electromagnet and said out-of-order signal for retaining said out-of-order signal in non-indicating position when said source of energy is operative and for effectuating movement of said out-of-order signal into indicating position when said source of energy is inoperative; release means connected to said main signal; and conductors connecting said release means with said main signal and said operating circuit for energizing said release means, said release means being intermittently energized when said main signal is operating, and being constantly energized when said main signal fails to operate even though energized by said source of energy, said release means counteracting the effect of said holding electromagnet in a manner to release said out-of-order signal when constantly energized.

7. In combination: a main signal; an operating circuit therefor; a source of energy for said operating circuit; means for closing said operating circuit; an out-of-order signal; mechanism for retaining said out-of-order signal in non-indicating position when said source of energy is operative and for effectuating movement of said out-of-order signal into indicating position when said source of energy is inoperative; control means for preventing said mechanism from automatically operating unless said out-of-order signal is in non-indicating position; release means connected to said main signal; and conductors connecting said release means with said main signal and said operating circuit for energizing said release means, said release means being intermittently energized when said main signal is operating, and being constantly energized when said main signal fails to operate when energized by said source of energy, said release means causing said mechanism to release said out-of-order signal when constantly energized.

8. In combination: a main signal; an operating circuit therefor; a source of energy for said operating circuit; means for closing said operating circuit; an out-of-order signal; a holding electromagnet for retaining said out-of-order signal in non-indicating position when said source of energy is operative and for effectuating movement of said out-of-order signal into indicating position when said source of energy is inoperative; control means for preventing said holding electromagnet from automatically operating unless said out-of-order signal is in non-indicating position; release means connected to said main signal; and conductors connecting said release means with said main signal and said operating circuit for energizing said release means, said release means being intermittently energized when said main signal is operating, and being constantly energized when said main signal fails to operate even though energized by said source of energy, said release means counteracting the effect of said holding electromagnet in a manner to release said out-of-order signal when constantly energized.

9. An out-of-order signal for use with a crossing signal of the class described, the combination of: an out-of-order signal swingable from non-indicating into indicating position; an engager on said signal; latch mechanism for engaging said engager for retaining said out-of-order signal in a position indicating that the device with which it is employed is in operative condition; electromagnetic means for retaining said latch mechanism in engaging position; means for energizing said electromagnetic means; means causing the deenergization of said electromagnetic means, when said out-of-order signal is not in position for said engager to be retained by said latch mechanism; releasing magnetic means adapted to oppose the effect of said electromagnetic means so as to release said latch mechanism when said releasing means is energized continuously but not when energized intermittently; and means for energizing said releasing means.

10. In combination: a wigwag signal; an out-of-order signal; a source of energy for operating said signals; latch means for holding said out-of-order signal in non-indicating position; electrical means for holding said latch means in latching position; and means for neutralizing said electrical means upon failure of said wigwag to operate when energized, said electrical means releasing said latch means upon failure of said source of energy.

11. In a signalling device, the combination of: a signal; means adapted to be operated by direct electric current for moving the signal; current supply means for supplying current for operating said first named means; an electrically actuated out-of-order signal mechanism designed to indicate a failure of said signal to be properly actuated when said signal is energized by said current, said out-of-order signal mechanism being responsive to a steady direct current but inoperative upon a pulsating current; and means for supplying a pulsating current to said out-of-order signal mechanism when said signal operates properly and for supplying a steady current to said out-of-order signal mechanism when said signalling device is supplied with current but said signal fails to operate properly.

In testimony whereof, I have hereunto set my hand at Los Angeles, California, this 14th day of November, 1924.

BURKETT D. NEWTON.

CERTIFICATE OF CORRECTION.

Patent No. 1,901,404.  March 14, 1933.

BURKETT D. NEWTON.

It is hereby certified that error appears in the printed specification of the above numbered patent requiring correction as follows: Page 5, line 95, claim 1, for "magnet" read "magnetic"; page 6, line 12, claim 3, for "operated" read "actuated"; and that the said Letters Patent should be read with these corrections therein that the same may conform to the record of the case in the Patent Office.

Signed and sealed this 16th day of May, A. D. 1933.

M. J. Moore.

(Seal) Acting Commissioner of Patents.